Sept. 20, 1971  H. K. TYSON ET AL  3,605,602
PISTON ROD ASSEMBLY

Filed Nov. 19, 1969  2 Sheets-Sheet 1

INVENTORS.
KARL W. WIKELSKI
HENRY K. TYSON
BY
ATTORNEY

INVENTORS.
KARL W. WIKELSKI
HENRY K. TYSON
BY
ATTORNEY

United States Patent Office 3,605,602
Patented Sept. 20, 1971

3,605,602
PISTON ROD ASSEMBLY
Henry K. Tyson and Karl W. Wikelski, Odessa, Tex.,
assignors to Dart Industries, Inc., Los Angeles, Calif.
Filed Nov. 19, 1969, Ser. No. 877,962
Int. Cl. F16j 1/14
U.S. Cl. 92—187          2 Claims

ABSTRACT OF THE DISCLOSURE

A piston rod assembly is described which reduces the operational stresses in the piston rod, piston rings and compressor cylinder thereby leading to longer operating lives for these parts. Briefly, the assembly comprises a piston segment and a piston rod segment, the piston segment having a plurality of piston rings mounted thereon along with two guide bushings which are in spaced apart relationship, and each of said piston segment and piston rod segment having mating substantially spherical end surfaces which are in end-to-end abutting relationship and connected by a threaded tension member.

---

This invention relates to a piston rod assembly for a compressor, particularly a high pressure compressor.

Heretofore, piston rod assemblies for compressors have generally consisted of a piston rod having a piston integrally connected or formed at one end. As installed for operation in the compressor system the piston portion of the assembly extends into the compressor cylinder for reciprocating operation while the opposite end of the piston rod is operably, but rigidly, connected to some driving means for imparting a reciprocating motion. Certain problems exist with respect to these piston rod assemblies in that the entire assembly acts as a unitary member whereby the fatigue life and wear of the piston rings and cylinder wall as well as the piston rod are accelerated due to misalignments. These misalignments result, in part, from certain dimensional variations among the parts even though they are generally precision manufactured to close tolerances. Alignment problems are further compounded by the human element in assembling the compressor systems. Moreover, additional alignment problems occur during normal operation as a result of relative movements, e.g. vibration, between the external driving force means and the compressor. As a result, the frequency at which the compressor must be shut down for repairs is relatively high.

In accordance with this invention there is provided a piston rod assembly wherein the accelerated fatigue life and wear of the piston rod, piston rings and cylinder wall due to the above described misalignments are substantially reduced. Briefly, the piston rod assembly comprises a piston rod segment and a piston segment which are placed in end-to-end abutting relationship in such a manner that misaligments occurring in the piston rod segment do not result in corresponding misalignments in the piston segment. In other words, the piston rod segment and piston segments do not function as a unitary member as do the presently known piston rod assemblies and, as a result, there is less stress build-up in the piston rod, piston rings and cylinder wall due to misalignments. This, of course, reduces the wear on the piston rod, piston rings and the cylinder wall and extends their lives leading to prolonged operation of the compressor prior to requiring repair.

Figure 1:
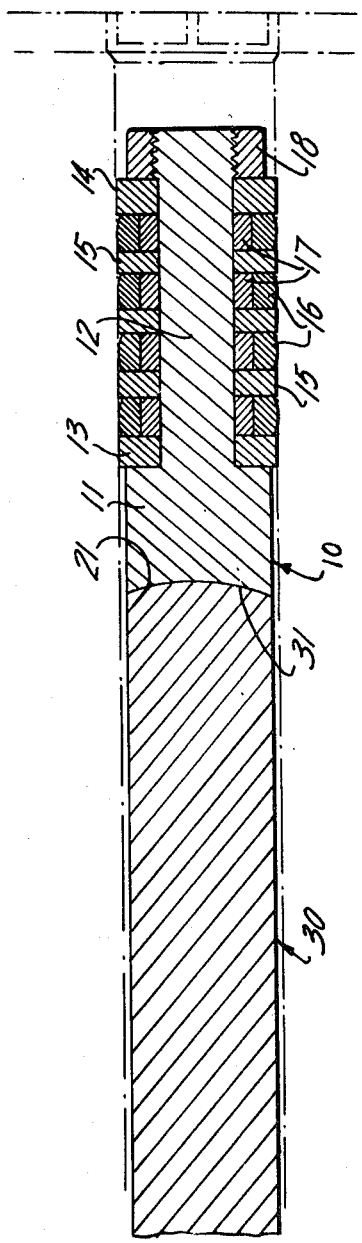

In more fully describing the invention, reference will be made to the drawings wherein:

FIG. 1 illustrates a longitudinal cross-sectional view of the piston end of one embodiment of the piston rod assembly of this invention, it being understood that the non-illustrated portion of the piston rod assembly, which is connected to the driving means, is of conventional construction. A partial cross-section of a conventional compressor cylinder is also shown in phantom lines surrounding the piston rod assembly to illustrate the operational relationship between the piston rod assembly and the compressor cylinder. Further details of such compressor cylinders may be found in U.S. Pat. No. 3,128,941.

Figure 2:
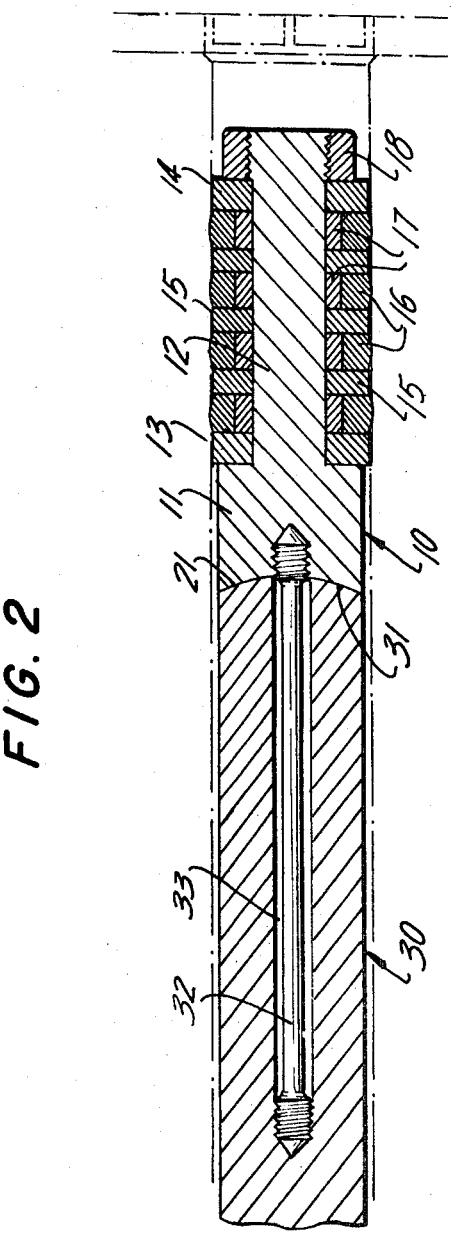

FIG. 2 illustrates a similar view as FIG. 1 but of another embodiment of the piston rod assembly of this invention.

With reference to FIG. 1, there is shown a piston rod assembly, generally cylindrical in shape, which includes a piston segment 10 and a piston rod segment 30. The piston segment 10 includes a base 11 and a ring mounting support section 12 extending outwardly therefrom. Mounted on the support section 12 is a rear guide bushing 13 and a front guide bushing 14 with a series of conventional land spacers 15 and sealing rings 16 mounted over ring spacers 17 being positioned therebetween in alternating relationship. A nut 18 threadedly engaging the end of support 12 serves to securely clamp the guide bushings, rings and spacers into abutting relationship with each other and against base 11.

Guide bushings 13 and 14 serve to maintain the alignment of the piston segment 10 within the compression cylinder and are essential to the successful operation of the piston rod assembly of this invention. While the two guide bushings illustrated are shown at the front and rear of the support so as to sandwich all of the piston rings therebetween, it should be understood that they may be positioned elsewhere provided they are not adjacent each other. These bushings may be formed from conventional materials used for this purpose, such as bronze, cast iron, and including self-lubricating materials such as graphite carbon.

The sealing rings 16, ring spacers 17 and land spacers 15 merely serve their normal function to provide a seal between the piston rod assembly and the cylinder wall. Such elements are conventional items that are commercially available and may be of a variety of constructions and materials as is well known in the art.

Forming the remainder of the piston rod assembly is piston rod segment 30. That portion of the piston rod segment 30 which is not illustrated is of conventional construction being coupled in the usual known manner to a means for imparting reciprocal motion. Since all of these aspects are well known in the art, further description is not necessary.

Both piston segment 10 and piston rod segment 30 are provided with complementary substantially spherical surfaces 21 and 31 which are in abutting relationship. Prior to mating the segments, these spherical surfaces may be lubricated to reduce any frictional forces which may tend to inhibit relative sliding movement between the two surfaces. It is also pointed out that while FIG. 1 indicates a convex spherical surface for the piston rod segment 30 and a concave spherical surface for piston segment 10, this relationship may be reversed. During operation of the piston rod assembly in the compressor system this joint between the two segments of the assembly is always located within the compressor cylinder.

Now then, the positioning of the joint between the two segments (10 and 30) is located well forward of the piston rod assembly so that when the assembly is mounted for operation in the compression system the mated spherical surfaces are well within the compressor cylinder at all times. During operation of the compressor system and as the piston rod assembly moves in a compression stroke, the piston rod segment 30, which is coupled to the driving means, pushes against the piston segment 10 thus ensuring that the two segments are always in abutting relationship. After completion of the compression stroke the piston rod segment 30 reverses its direction of movement for the suction stroke. This reversal of direction tends to create a vacuum between the piston rod segment and piston segment since the two segments are not coupled together. However, during this phase of the operation the pressure of the incoming fluid, which is to be compressed, is such that there is an adequate force on the piston segment 10 to cause it to also move rearwardly and follow the piston rod segment in abutting relationship. Thus, both the piston segment 10 and the piston rod segment 30 move in unison in a reciprocating manner even though there is no coupling means therebetween.

As for the aforementioned misalignments it is pointed out that the spherical joint will permit the piston rod segment 30 to tolerate the misalignments to some extent by permitting relative movement between the two segments of the assembly, thus substantially reducing any stress build-up. At the same time essentially no stresses are built up in the piston segment 10 which is maintained substantially in alignment with the cylinder by way of the dual guide bushings 13 and 14. Thus, the piston rod assembly as well as the cylinder are subjected to substantially reduced fatigue and wear.

Looking next to FIG. 2 there is shown another embodiment of the invention and one which is particularly useful in the event there is insufficient pressure on the incoming fluid stream to cause the piston segment 10 to remain in abutting relationship with the piston rod segment 30 during the suction stroke of the compressor system. In this embodiment everything is identical with the piston rod assembly described in connection with FIG. 1 except that the two segments are held together by a tension member 32. This tension member extends longitudinally within a cylindrical bore 33 in the piston rod segment and threadedly engages the piston segment 10 and the piston rod segment 30 at its opposite ends. The bore 33 is of somewhat larger diameter than that of the tension member and both are generally axially aligned with the piston rod assembly.

In assembling the piston rod assembly shown in FIG. 2 the tension member 32 is initially inserted in the bore 33 of the piston rod segment 30 and threaded into the base of the bore. A sealant may be used on the threads to ensure that the member does not become unthreaded during operation of the assembly in the compressor. In addition, it may be desirable to employ a locking pin or wedge for further assurance. Once the tension member has been assembled within the piston rod segment the piston segment 10, having the guide bushings and rings already assembled thereon, is then threaded onto that end of the tension member extending beyond the spherical surface of the piston rod segment. The piston segment is preferably only threaded to handtightness plus a small fraction of a turn, e.g. one tenth of a turn, whereby the spherical surfaces of the two segments are snugly mated together. It is essential that the piston segment not be overly tightened on the tension member so that the two segments of the assembly do not act as a unitary member.

During operation of the compression system the piston rod assembly, as shown in FIG. 2, performs in the same manner as that embodiment shown in FIG. 1. The piston rod segment 30 will be able to tolerate misalignments to some extent due to the spherical joint although in this case certain stresses are built up in the tension member. The tension member, however, may conveniently be made of a material which can better withstand these stresses than the piston rod segment or piston segment. In any event, substantially no stresses or misalignments are transmitted to the piston segment 10. Again the dual guide bushing arrangement on the piston segment serves to maintain that portion of the piston rod assembly in substantial alignment within the compressor cylinder independently of the piston rod segment.

Thus, having described the invention in detail it will be understood by those skilled in the art that certain variations and modifications may be made without departing from the spirit and scope of the invention as disclosed herein and as defined in the appended claims.

We claim:

1. A piston rod assembly which includes a piston segment and a piston rod segment, said piston segment having a plurality of piston rings mounted thereon along with two guide bushings which are in spaced apart relationship, said piston segment and piston rod segment having mating substantially spherical end surfaces which are in abutting relationship, said piston rod segment having an internally threaded closed end bore extending longitudinally thereof communicating with its spherical end surface, and an elongated tension member having threaded ends disposed within said bore with one end threadedly engaging the piston rod segment at the base of the bore and the other end threadedly engaging an internally threaded closed end bore in the piston segment at its spherical end surface.

2. A piston rod assembly according to claim 1 wherein the piston rod segment bore has a radial clearance with said tension member throughout the unthreaded length of said tension member.

References Cited
UNITED STATES PATENTS

| | | | |
|---|---|---|---|
| 3,353,456 | 11/1967 | Baver | 92—258 |
| 3,398,652 | 8/1968 | Miller | 92—165 |
| 3,481,255 | 12/1969 | Erdmann et al. | 92—258 |

FOREIGN PATENTS

| | | | |
|---|---|---|---|
| 219,471 | 5/1942 | Switzerland | 92—129 |

MARTIN P. SCHWADRON, Primary Examiner

I. C. COHEN, Assistant Examiner

U.S. Cl. X.R.

92—258